(12) United States Patent
Ott

(10) Patent No.: US 11,007,493 B2
(45) Date of Patent: May 18, 2021

(54) GASSING DEVICE

(71) Applicant: Alexander Ott, Hannover (DE)

(72) Inventor: Alexander Ott, Hannover (DE)

( * ) Notice: Subject to any disclaimer, the term of this patent is extended or adjusted under 35 U.S.C. 154(b) by 245 days.

(21) Appl. No.: 16/318,511

(22) PCT Filed: Jul. 5, 2017

(86) PCT No.: PCT/DE2017/100564
§ 371 (c)(1),
(2) Date: Jan. 17, 2019

(87) PCT Pub. No.: WO2018/014909
PCT Pub. Date: Jan. 25, 2018

(65) Prior Publication Data
US 2019/0232237 A1 Aug. 1, 2019

(30) Foreign Application Priority Data

Jul. 18, 2016 (DE) ...................... 10 2016 113 204.7

(51) Int. Cl.
*B01F 3/04* (2006.01)
*C02F 3/20* (2006.01)

(52) U.S. Cl.
CPC .......... *B01F 3/04269* (2013.01); *C02F 3/201* (2013.01); *B01F 2003/04361* (2013.01);
(Continued)

(58) Field of Classification Search
CPC .. B01F 2003/04368; B01F 2003/04361; B01F 3/04269; B01F 2215/0052; C02F 3/201; Y02W 10/10
See application file for complete search history.

(56) References Cited

U.S. PATENT DOCUMENTS

2012/0193818 A1* 8/2012 Hirose ................ B01F 3/04269
261/100
2013/0093106 A1* 4/2013 Hoefken ............. B01F 3/04255
261/64.1
(Continued)

FOREIGN PATENT DOCUMENTS

DE 34 41 731 A1 5/1986
DE 10 2009 041 992 A1 7/2010
(Continued)

OTHER PUBLICATIONS

Epo translation of WO 02102720 (Year: 2002).*
(Continued)

*Primary Examiner* — Stephen Hobson
(74) *Attorney, Agent, or Firm* — Collard & Roe, P.C.

(57) ABSTRACT

A gassing device for the intermittent introduction of oxygen-containing gas or air into the waste water of a sewage treatment plant includes at least one membrane and a support body supporting the membrane and having gas-inlet openings. The membrane comprises a support membrane and a gassing membrane, wherein through-openings are arranged in the support membrane and continuous perforation slits are arranged in the gassing membrane and connected to the through-openings of the support membrane, or project into same, or are arranged inside the through-openings. The gassing membrane has a greater elasticity and is softer than the support membrane. The width of the through-openings of the support membrane decrease from the outer side and the gassing membrane projects partially or completely into the through-openings of the support membrane, and has a corresponding negative contour in relation to the through-openings of the support membrane.

12 Claims, 1 Drawing Sheet

Figure 1:
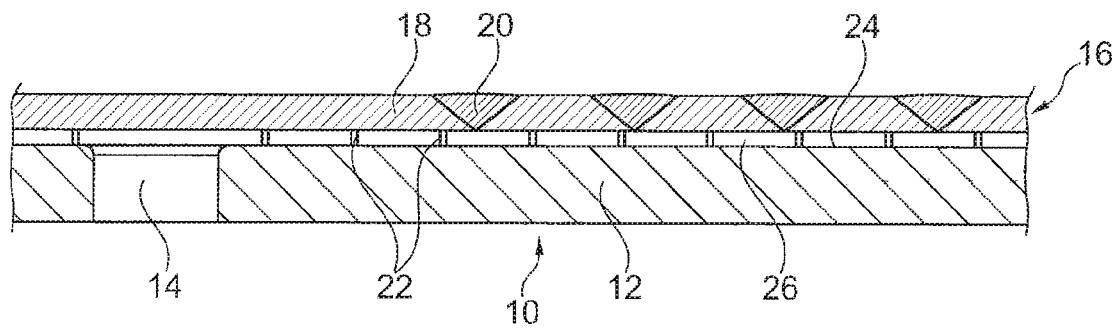

(52) U.S. Cl.
CPC .............. *B01F 2003/04368* (2013.01); *B01F 2215/0052* (2013.01); *Y02W 10/10* (2015.05)

(56) References Cited

U.S. PATENT DOCUMENTS

| | | | |
|---|---|---|---|
| 2014/0264965 A1* | 9/2014 | Jager | C02F 3/201 |
| | | | 261/64.1 |
| 2017/0210652 A1* | 7/2017 | Frankel | B29C 45/14377 |
| 2017/0296987 A1* | 10/2017 | Wadman | B29C 48/151 |
| 2019/0374910 A1* | 12/2019 | Zhang | C02F 3/201 |

FOREIGN PATENT DOCUMENTS

| | | |
|---|---|---|
| DE | 10 2010 015 059 A1 | 10/2011 |
| DE | 10 2014 226 134 A | 6/2016 |
| EP | 1 129 768 B1 | 5/2005 |
| EP | 2 757 075 A | 7/2014 |
| FR | 1 402 244 A1 | 6/1965 |
| JP | 2014-079729 A | 5/2014 |
| JP | 2015-085227 A | 5/2015 |
| WO | WO-02102720 A1 * 12/2002 .............. C02F 3/201 |

OTHER PUBLICATIONS

English translation of the International Preliminary Report on Patentability and Written Opinion of the International Searching Authority in PCT/DE2017/100564, dated Jan. 31, 2019.
International Search Report of PCT/DE2017/100564, dated Jul. 5, 2017.
Response to WIPO by European Patent Attorneys in PCT/DE2017/100564, dated Feb. 14, 2018.

\* cited by examiner

GASSING DEVICE

CROSS REFERENCE TO RELATED APPLICATIONS

This application is the National Stage of PCT/DE2017/100564 filed on Jul. 5, 2017, which claims priority under 35 U.S.C. § 119 of German Application No. 10 2016 113 204.7 filed on Jul. 18, 2016, the disclosure of which is incorporated by reference. The international application under PCT article 21(2) was not published in English.

The invention relates to a gassing device for the intermittent introduction of oxygen-containing gas or air into a liquid or the waste water of a sewage treatment plant, in accordance with the preamble of claim 1.

The biological purification process of waste water requires oxygen so that microorganisms contained in the waste water are able to decompose harmful substances. In what is called microbubble aeration of the waste water, air is introduced into the waste water by way of aerators. In this regard, the aerators fulfill the purpose of dividing up the air volume stream that is introduced into the waste water, in such a manner that as much oxygen as possible can be introduced into the waste water from the air.

There are different types of purification processes in biological waste water purification. One form is what is called the continuous activation method. In this regard, air is introduced into the waste water in uninterrupted manner. Another form is what is called the intermittent activation method. In this regard, air is introduced at a specific frequency and rate, and then no air is introduced for a certain period. In the phases of intermittent activation methods in which no air is introduced into the waste water, the water column of the waste water acts on the aerators.

There are aerators, among others, that are provided with a membrane, and rigid aerators. Aerators having a membrane consist of multiple components. In general an aerator has a support body that is enclosed by a membrane. Rigid aerators consist of a solid material into which holes are introduced.

Containers having a membrane are either structured in such a manner that the membrane closes as soon as no air is introduced into the waste water through the membrane, or, in the case that the membrane does not close tightly, kickback valves are built into the support body. Both measures are supposed to prevent that waste water can penetrate below the membrane and lead to clogging. In the case of rigid aerators, as well, kickback valves can be installed in the support body. However, these cannot completely prevent waste water from penetrating into the holes of the solid material and leading to clogging, which can impair the performance of the aerators.

For operation of both types of aerators, it holds true that the required oxygen should be efficiently introduced into the waste water. In this regard, the efficiency depends on how much energy is required to introduce the air into the waste water by means of the aerators, and on the oxygen transfer. The required energy loss is determined by the pressure loss of the aerators. The pressure loss describes the necessary energy that is required for dividing the air volume stream up into microbubbles.

The pressure loss of membrane aerators depends on the opening pressure of the membranes. This opening pressure is influenced by the slit size and the resistance that the membrane material demonstrates against opening of the membrane. The smaller the slit, the greater the pressure loss. The more rigid/inflexible the material, the greater the pressure loss. In the case of rigid aerators, the pressure loss is determined by way of the size of the holes in the aerators. Since opening of the membranes does not take place here, solely the type of hole determines the pressure loss.

The oxygen transfer is determined by the bubble size and the bubble ascent velocity. The more finely the air volume stream is divided up into bubbles, the greater the boundary surface of the air becomes, so that with the same amount of air, more oxygen can be consumed from the air by the microorganisms. The slower the air bubbles ascend in the waste water, the greater the dwell time in the waste water, so that the microorganisms have more time to consume oxygen from the air.

The size of the air bubbles is at first determined by the slit size in the membranes or by the size of the holes in the rigid containers. Once the air bubbles have then come loose from the aerators, the individual air bubbles can combine in the waste water due to collisions, to form a larger air bubble. This worsens the transfer of oxygen into the waste water. Collisions of this type are also influenced by the exit velocity of the bubbles from the aerator. Bubbles that shoot out quickly tend to collide more than bubbles that come loose slowly and gently. The exit velocity of the air bubbles furthermore determines their ascent velocity for the most part. The faster an air bubble exits from the aerator, the faster it ascends upward.

For the production of aerators, it holds true, with regard to performance and energy efficiency, to structure the aerators in such a manner that the smallest bubbles possible are introduced into the waste water at the lowest possible pressure loss, as slowly and in as collision-free a manner as possible. Between pressure loss, bubble size, and ascent velocity, the relationship exists that a small slit produces a greater pressure loss, and this greater pressure loss brings about the result that the air bubble is introduced into the waste water with greater energy by the aerator.

Accordingly, a great pressure loss is not only disadvantageous in terms of energy, because a blower must expend more energy so as to convey the air into the waste water by means of the aerator, but rather a great pressure loss also leads to a faster ascent velocity and more collisions of the air bubbles, and thereby has a negative influence on the oxygen transfer to the waste water. Here, it is important in the production of the aerators to find a compromise among pressure loss, bubble size, and ascent velocity. For membrane aerators, this means that the softest possible membrane is provided with a low opening pressure with the smallest possible slits.

In the use of the aerators, an additional factor is that membrane aerators must fulfill certain mechanical requirements. Since the membrane is affixed above a support body, and since the air can escape into the waste water solely through the membrane openings, and since a certain pressure is required to open the membrane, the membrane at first expands up to the point at which the pressure below the membrane is so great that the membrane opens.

This expansion of the membrane leads to tensile forces and stresses in the material. Specifically during intermittent use, a change between "relaxed" and "expanded" leads to weakening/wear of the membrane. Expansion of the membrane furthermore brings about the result that the air preferably exits at those locations where the tensile forces are the greatest. In this way, it is prevented that all the existing membrane openings are 100% active, and thereby the performance of the aerators is impaired.

In order to reduce expansion of the membrane, nowadays what are called hold-downs or materials that expand less are used. Hold-downs are textiles or other rigid materials that are introduced into the membrane and are connected with the support body in such manner that they counteract expansion.

Membrane materials that expand less are more rigid/inelastic materials or materials having a very low pressure loss. More rigid/inelastic materials bring about a greater pressure loss. Softer/more elastic membranes having a low opening pressure counteract expansion, because the energy of the air volume stream can be more rapidly conducted away through the membrane openings.

In the case of a softer/more elastic material, the pressure of the water column on the membrane in the non-operating phase leads to the result that the water pressure compresses the membrane material. This compression leads to the result, in the regions of the membrane openings, that these do not close tightly, and waste water penetrates.

Softer/more elastic materials have a lower continued tear resistance than harder/more inelastic materials. It is known that expansion of membranes and the resulting tensile forces in the material bring about the result that the membranes start to tear in the region of the membrane opening and can be destroyed. The use of these materials is therefore not possible nowadays.

Since the membrane is positioned above a support body, it is structured to be larger than the support body. This brings about the result that the water pressure that acts on the membrane when no air is being introduced deforms the membrane. In this regard, the membrane material is first pressed against the support body, wherein the excess material is brought together to form a wrinkle. This wrinkle formation brings about tensions at the membrane surface and reduces the durability of the membrane at these locations. Cracks or brittleness come(s) about.

In contrast, porous containers have the advantage that no membrane that is exposed to mechanical stresses is installed. Damage caused by cracks or different opening of the membranes does not occur here. However, waste water always penetrates into the aerators, causing clogging.

The use of aerators for biological waste water purification by means of microorganisms is sufficiently known and has been extensively documented in the prior art (EP 1 129 768 B1, DE 10 2010 015 059 A1, JP 2015-085227 A).

In order to prevent damage to the membrane, membranes are used, in the state of the art, that have a Shore hardness of 65-70. The greater the Shore hardness of the membrane, the greater the pressure must be to which the membrane is exposed. However, the elevated pressure leads to enlarged air bubbles that are given off into the waste water.

Attempts to make a soft-elastic membrane more robust and less subject to wear by means of a woven fabric reinforcement, see DE 10 2009 041 992 A1, JP 2015-085227 A, have proven to be insufficiently advantageous.

Another disadvantage to be avoided consists in that the membrane is expanded more in the central region, particularly in the case of plate-shaped aerators, than in the edge regions. This leads to the result that the perforation slits are opened further, and the liquid column is reduced further in comparison with the edge regions. Both effects lead to the result that more air is given off to the waste water in the central region of the aerators than in the edge regions. A non-uniform gassing profile occurs over the surface of the membrane.

In order to avoid increased doming in the central region of an aerator and thereby to guarantee uniform emission of gas bubbles over the surface of the aerator, it is known from JP 2014-079729 A to structure the central region to be thicker than the edge regions. However, this approach leads to increased material use and consequently to higher production costs. Furthermore, it is not able to solve the problems of reduced durability based on mechanical stress in the edge region.

From DE 10 2014 226 134 A1, an air distributor is known, in which a functional layer on the waste water side, a support layer, and a sealing layer are present in a multi-layer structure. The support layer has a greater hardness than the sealing layer. Air passage openings penetrate all three layers and can be structured to be cylindrical or conical, wherein the air passage openings narrow toward the sealing layer in the conical configuration.

The present invention is based on the task of eliminating the stated problems when introducing a gas into a liquid, and of making available a gassing device having a membrane that demonstrates improved durability during intermittent operation of the gassing device, guarantees uniform gas exit with the smallest possible bubble formation over the entire surface of the membrane, and is cost-advantageous in terms of production.

This task is accomplished, in the case of a gassing device in accordance with the preamble of claim 1, by the characterizing features of this claim. Further developments and advantageous embodiments are evident from the dependent claims.

The gassing device according to the invention departs from the concept that has been usual in the state of the art until now, of a homogeneous, single-piece structure of the membrane, and instead consists of a combination of a support membrane with a gassing membrane. In this regard, the different properties of the elasticity of the support membrane and of the gassing membrane as a compound structure lead to a synergy effect that allows exit of gas bubbles having a small bubble size and low exit and ascent velocity due to a low opening pressure, and furthermore leads to more uniform distribution of the exit of gas bubbles on the entire surface of the membrane, creates a reliable seal against penetrating liquid during non-operation, and demonstrates constant operating properties over a long period of use, due to low wear.

These results are achieved by the greater elasticity and softness of the gassing membrane as compared with the support membrane, which possesses comparatively rigid properties. At the same time, passage openings of the support membrane communicate with perforation slits of the gassing membrane, and thereby allow low-resistance gas transfer into the fluid at a low opening pressure, while vice versa, the function as a kickback valve during non-operation ensures a tight seal even at a high hydrostatic counter-pressure.

The difference between a passage opening and a perforation slit consists in that the passage opening is always present as an opening, and the perforation slits are so narrow that these close off the perforation slit in the shut-off state of the gassing device, due to the regions lying against one another.

The opening pressure required due to the embodiment according to the invention is lower than in the case of traditional membranes according to the state of the art. Because of the compound structure of the gassing membrane with the carrier membrane as a composite material, the membrane cannot dome up and over-expand, and therefore it does not tend to form wrinkles during non-operation, and therefore does not tend toward premature brittleness or fatigue of the material. Furthermore, widening of individual perforation slits does not occur, so that a uniform pressure prevails at all available perforation slits, and these actively participate in gassing. This leads to greater efficiency of the energy of the air volume stream used for gassing.

Because of the possibility of using a soft material having a fundamentally lower opening pressure of the membrane, at the same slit size, in comparison with a membrane having a harder material, a slit in the rigid membrane can always be configured to be smaller at the same pressure loss than in the case of a membrane having a harder material, without negatively influencing the pressure loss or the exit velocity of the air bubble from the membrane.

The passage openings of the support membrane decrease, in terms of the inner width, from the outer side that faces the liquid to the inner side that faces the gas feed, and can preferably be configured as a cone or truncated cone or pyramid or truncated pyramid. The gassing membrane projects into the passage openings of the support membrane in the region of its perforation slits, in whole or in part, and has a corresponding negative contour relative to the passage openings of the support membrane.

The integration of the perforation slits in the interior of the passage openings leads to a short and therefore low-resistance flow path of the gas through the membrane. The conical shape of the passage openings and the negative shape of the gassing membrane having the perforation slits prevents undesirable excessive deformation of the gassing membrane when the gas feed is shut off, and stress caused by the hydrostatic force of the liquid column that then acts from the outside. This is because the counter-force, which reduces deformation, is applied by the slanted side walls of the passage openings of the support membrane. At the same time, the side walls of the perforation slits are pressed against one another more strongly, and thereby allow a reliable sealing effect as a kickback valve, wherein the sealing effect actually also increases with an increasing hydrostatic pressure.

It can be advantageous if the composite material is a particle composite material or a layer composite material.

In the case of the present invention, a particle composite material means a composite material that consists of a first material into which at least one passage opening is introduced. A second material is disposed in the passage openings of the first material.

A layer composite material consists of at least two layers, wherein the layers can consist of different materials having different properties.

In this way, it is possible to use a soft-elastic plastic for emitting the gas to the liquid, but this plastic can be used only in small amounts.

As a further embodiment variant, the gassing membrane can completely cover the upper side of the support membrane that faces the waste water, or the gassing membrane can consist of a plurality of inserts that are individually disposed in the passage openings of the support membrane.

The embodiment mentioned first allows a composite of the gassing membrane with the support membrane over a large area, and thereby distributes the stress of the boundary layer between the gassing membrane and the support membrane onto a larger surface area than the passage openings of the support membrane. For this purpose, however, a greater use of material, of the material for the gassing membrane, is required, and this is more expensive as compared with the material for the support membrane.

In the case of the second embodiment, the force exerted on the island-shaped inserts of the gassing membrane must be absorbed entirely by the boundary layer between the gassing membrane and the passage openings of the support membrane. In return, however, the use of material, of the more expensive material of the gassing membrane as compared with the material for the support membrane, is restricted to the region of the passage openings of the support membrane, and thereby cost advantages occur for the gassing device.

It can be advantageous if the support membrane has a Shore A hardness of greater than 60.

The rigidity of the support membrane can be adapted as a function of the purpose of use, in particularly as a function of the size of the liquid column that is present above the membrane.

It can be advantageous if the gassing membrane has a Shore A hardness of less than 60.

The lower the Shore hardness, the more elastic the material. Elastic materials have the advantage that the pressure for introducing the gas into the liquid can be very much lower than if a more rigid membrane were to be used. In this regard, the elasticity can be adapted to the external conditions. For liquid columns as they are usual in sewage treatment plants, materials with Shore hardness values in the ranges indicted for the gassing membrane and for the support membrane, in each instance, have proven to be advantageous.

The gassing membrane can preferably be an ethylene-propylene-diene rubber (EPDM) or a nitrile rubber (NBR nitrile butadiene rubber) or a silicone or a polyurethane (PU).

With these materials, it is possible to achieve the desired Shore hardness in the required range, and the quality requirements with regard to low wear and long useful lifetime can be fulfilled.

It can be advantageous if the perforation slits are configured in line shape or cross shape or star shape.

The type and number of perforation slits decisively influences the opening behavior of the perforation slits and thereby the gas emission to the surrounding liquid. The more slits are present above a passage opening, the easier it is for the perforation slit to open, and the more gas can escape.

In this regard, a line-shaped perforation slit is understood to mean a simple slit in a straight line, which passes through the gassing membrane on the entire thickness of the gassing membrane. In the case of a cross-shaped arrangement, at least two intersecting slits are present, which assume any desired angle relative to one another, preferably an angle of 90° relative to one another, whereas a star-shaped pattern comprises at least three slits that intersect at a point.

According to a further development, the support body or the support membrane can have spacer elements in the form of a support matrix on the side that faces the support membrane or the support body.

These spacer elements serve to initiate gas exit from all the perforation slits immediately after the gas feed is turned on, and, simultaneously, gas exit from all the perforation slits. If, specifically, the support membrane was previously pressed against the support body due to the liquid column, at first energy would have to be expended to release the support membrane from the support body. However, this procedure would require time and would spread out, at first, from a location at which the gas enters into the interstice between the support body and the membrane from gas inlet openings. In this case, only those perforation slits at which the membrane has already lifted off from the support body would become active first. Due to the support matrix, the membrane is prevented from lying against the support body in its entirety. Therefore a space that extends over the entire lower surface of the membrane and upper surface of the support body remains, by which space gas can immediately get to all the perforation slits and exit, after the gas feed is turned on.

It can be advantageous if the membrane is free of passage openings and perforation slits in the region of the gas inlet openings of the support body.

In this way, direct gas exit in this region is prevented, and the gas is distributed below the entire surface area of the membrane before it is uniformly emitted to the liquid by way of all the perforation slits.

Figure 2:
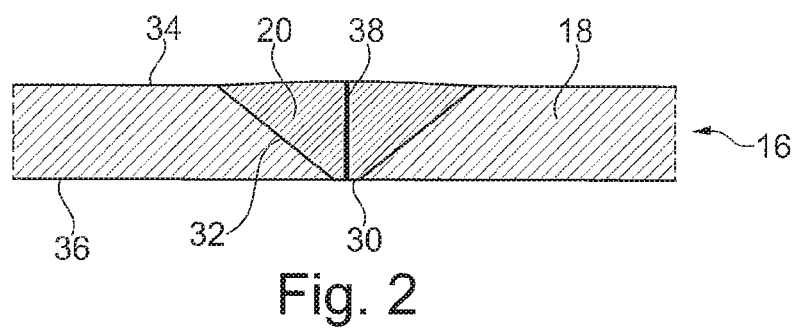
Figure 3:
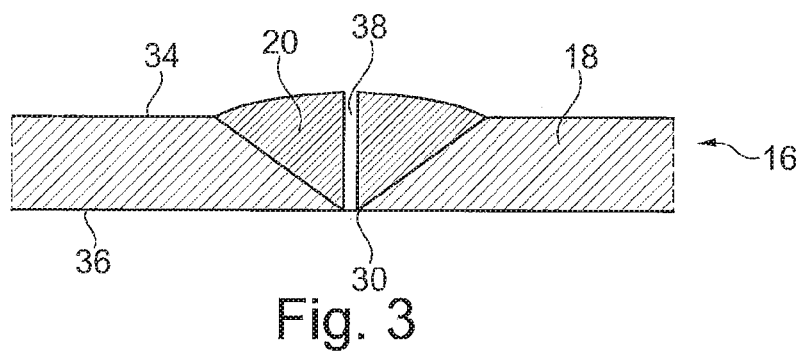
Figure 4:
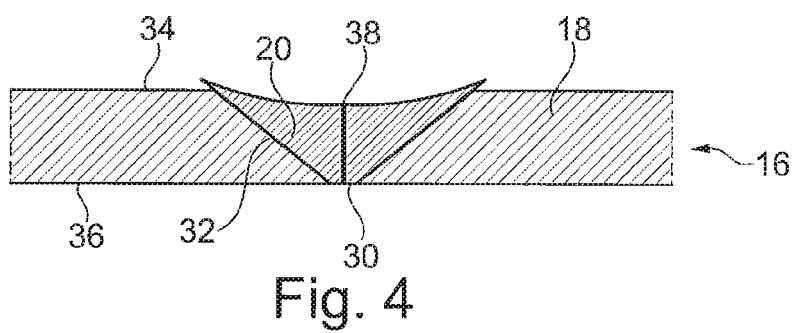

Further developments and advantageous embodiments of the invention are evident from the following descriptions of exemplary embodiments, which are shown in the drawing. The drawing shows:

FIG. 1: a schematic sectional view of a partial region of a gassing device according to the invention, FIG. 2: as a detail of FIG. 1, a schematic sectional view of a membrane of the gassing device, in the original, unused state, FIG. 3: as a detail of FIG. 1, a schematic sectional view of a membrane of the gassing device, during operation with the gas feed turned on, and FIG. 4: as a detail of FIG. 1, a schematic sectional view of a membrane of the gassing device, during operation with the gas feed shut off.

When the same reference numbers are used in FIGS. 1 to 4, these refer to the same parts, so that for the purpose of avoiding repetition, a component that has already been described does not need to be discussed again in every figure description.

FIG. 1 shows a schematic sectional view of a partial region of a gassing device 10 according to the invention. A membrane 16 is mounted on a support body 12 having a gas inlet opening 14, which membrane in turn consists of a support membrane 18 and a gassing membrane 20. The support membrane 16 has spacer elements 22 on its side facing the support body 12, which elements are disposed in the form of a support matrix. These spacer elements 22 create a permanent interstice 28 between the upper surface 24 of the support body 12 and the lower surface 26 of the support membrane 18, and thereby the gas supplied through the gas inlet opening can spread out completely into the space 28 between the support body 12 and the support membrane 16, and does not first have to prepare its path to the passage openings and perforation slits by lifting the membrane. The gas inlet 14 that is shown, however, is situated in a region of the membrane 16 that is free of passage openings and perforation slits. In this way, it is prevented that the supplied gas does not preferentially seek the shortest exit path, but rather can first spread out uniformly to the other passage openings and perforation slits, before being transferred to the liquid.

FIG. 2 shows, as a detail of FIG. 1, a schematic sectional view of a membrane of the gassing device, in the original, unused state.

Passage openings 30 are disposed in the support membrane 18, only one of which openings is shown in this figure and the following figures, in each instance. The inner walls 32 of the passage opening 30 run from the outer side 34, which faces the liquid, to the inner side 36, which faces the gas supply side, in a slanted progression, approximately in the shape of a V. The clear width of the passage openings 30 therefore narrows from the outer side 34 to the inner side 36. From a spatial point of view, this involves restriction of a cone or truncated cone.

This passage opening 30 is filled with the material of the gassing membrane 20. The gassing membrane 20 therefore does not extend continuously over the entire outer surface of the support membrane 18, in the preferred embodiment, but rather is restricted solely to the passage openings 30 of the support membrane 18, as individual islands. The gassing membrane 20 and the support membrane 18 form a composite material, in other words the boundary layers are intimately connected with one another and also remain so during operation as intended, and can only be separated by means of destruction. The gassing membrane 20 and the support membrane 18 differ with regard to their elasticity and softness. While the gassing membrane 20 is highly elastic and soft, the support membrane 18 behaves in comparatively inelastic and hard manner, in other words almost as a rigid body. These different properties are achieved by means of different materials or different additives in similar or the same basic materials.

The gassing membrane 20 has a central perforation slit 38, which extends from the inner surface 36, from which the gas is supplied, to the outer surface 34, at which the liquid is present. The perforation slit 38 can be configured in line shape or cross shape or star shape, in detail.

FIG. 3 shows, as a detail of FIG. 1, a schematic sectional view of a membrane of the gassing device, during operation with the gas feed turned on. In this case, the pressure that acts on the inner wall 36 of the membrane 16 and thereby also on the gassing membrane 20 is greater than the hydrostatic pressure of the liquid that acts on the outer wall 34 of the gassing membrane 20 from the outside. Due to the pressure difference, the gassing membrane 20 expands slightly outward, and at the same time stretches at the conical boundary layers 32 toward the support membrane 18 due to its elasticity and softness. In this regard, the perforation slit 38 opens, so that gas can flow through and gas bubbles can exit and pass over into the liquid. Doming and stretching of the gassing membrane 20 takes place over a very small path distance, so that no lasting over-stretching and undesirable wrinkle formation can occur after the gas feed is shut off, in the relaxed state.

This is also achieved in that only a small attack surface from the direction of the inner side 32 of the membrane 16 is present due to the conical configuration or the configuration as a truncated cone. The support membrane 18 behaves comparatively significantly more rigidly, and therefore practically does not support deformation of the gassing membrane 20 at all. Furthermore, the configuration and property with regard to elasticity and softness of the gassing membrane 20 allows very good metering of the gas amount that is transferred to the liquid, as a function of the pressure. In this regard, the microbubble nature is maintained within broad limits.

FIG. 4 shows, as a detail of FIG. 1, a schematic sectional view of a membrane of the gassing device, during operation with the gas feed shut off.

In this case, the hydrostatic pressure of the liquid column which is in effect from the outer side 34 of the membrane 16 is greater than the pressure on the inner side 36 of the membrane 16. Since the surface that faces outward toward the liquid is large, due to the geometric configuration of the gassing membrane 20, the hydrostatic pressure of the liquid can exert a great force on the gassing membrane 20, and this leads to a shift toward the inner side 36 of the membrane and to the walls of the perforation slits 38 being pressed together, in the case of the conical shape. At the same time, in this regard, the surface of the gassing membrane 20 that faces the outer side 34 is dented in slightly. Due to the conical shape, the force with which the walls of the perforation slits 38 are pressed against one another is directly dependent on the hydrostatic pressure, so that the sealing effect is also maintained with an increasing hydrostatic pressure. In this case, however, no expansion takes place, but rather shrinkage of the gassing membrane 20 takes place, in other words in the other direction from its neutral state as compared with expansion. Unilateral stress, which could lead to brittleness and fatigue of the material, is thereby prevented.

REFERENCE SYMBOL LIST 10 gassing device
12 support body
14 gas inlet opening
16 membrane
18 support membrane
20 gassing membrane
22 spacer elements
24 upper surface
26 lower surface
28 interstice
30 passage opening
32 inner wall of the passage opening
34 outer side
36 inner side
38 perforation slit

The invention claimed is:

1. A gassing device for intermittent introduction of oxygen-containing gas or air into a liquid or waste water of a sewage treatment plant, comprising
   at least one membrane comprising a support membrane and a gassing membrane; and
   a support body having gas inlet openings;
   wherein the support body carries the at least one membrane,
   wherein passage openings are disposed in the support membrane, and continuous perforation slits are disposed in the gassing membrane;
   wherein the perforation slits of the gassing membrane follow the passage openings of the support membrane or project into the passage openings or are disposed within the passage openings, and the gassing membrane demonstrates greater elasticity and is softer than the support membrane;
   wherein the passage openings of the support membrane decrease, in terms of inner width of the passage openings, from an outer side of the support membrane that faces the liquid or the waste water to an inner side of the support membrane that faces a gas feed; and
   wherein the gassing membrane projects into the passage openings of the support membrane in a region of the perforation slits, in whole or in part, and has a corresponding negative contour relative to the passage openings of the support membrane.

2. The gassing device according to claim 1, wherein the passage openings of the support membrane are configured conically as a cone or a truncated cone or a pyramid or a truncated pyramid.

3. The gassing device according to claim 1, wherein the gassing membrane and the support membrane comprise a composite material.

4. The gassing device according to claim 3, wherein the composite material is a particle composite material or a layer composite material.

5. The gassing device according to claim 1, wherein the gassing membrane fully covers the outer side of the support membrane facing the liquid or the waste water.

6. The gassing device according to claim 1, wherein the gassing membrane a plurality of inserts individually disposed in the passage openings of the support membrane.

7. The gassing device according to claim 1, wherein the support membrane has a Shore A hardness of greater than 60.

8. The gassing device according to claim 1, wherein the gassing membrane has a Shore A hardness of less than 60.

9. The gassing device according to claim 1, wherein the gassing membrane is an ethylene-propylene-diene rubber (EPDM), a nitrile rubber (NBR nitrile butadiene rubber), a silicone, a polyurethane (PU).

10. The gassing device according to claim 1, wherein the perforation slits are configured in line shape or cross shape or star shape.

11. The gassing device according to claim 1, wherein the support body or the support membrane has spacer elements forming a support matrix on a side that faces the support membrane or the support body.

12. The gassing device according to claim 11, wherein the at least one membrane is free of passage openings and perforation slits in a region of the gas inlet openings of the support body.

* * * * *